Dec. 29, 1942.   J. G. BENSON ET AL   2,306,367
RECTIFYING APPARATUS
Filed June 13, 1941   2 Sheets-Sheet 1

INVENTORS
JOHN G. BENSON
JAMES G. VAN VLEET
GEORGE J. BOSHKOFF
BY
Chas. C. Scheffler
ATTORNEY Dec. 29, 1942.　　J. G. BENSON ET AL　　2,306,367
RECTIFYING APPARATUS
Filed June 13, 1941　　2 Sheets-Sheet 2
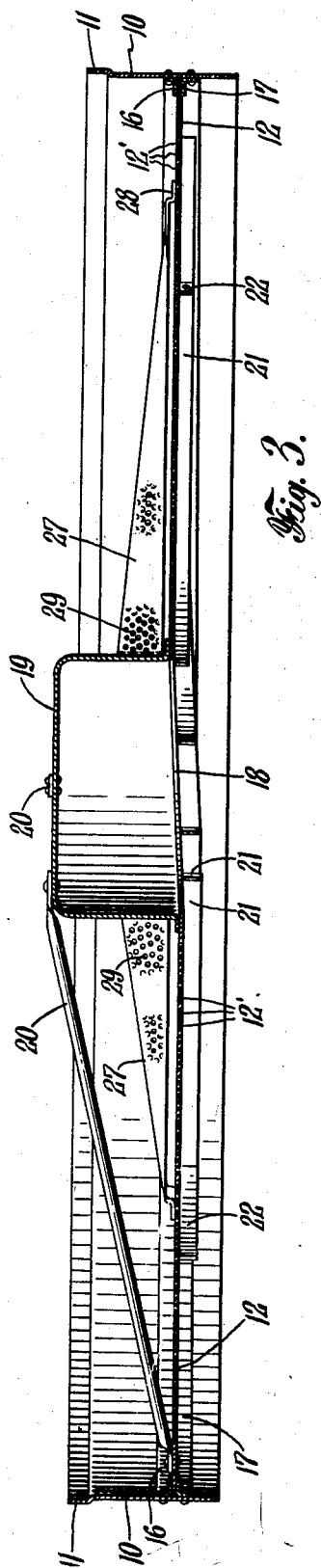
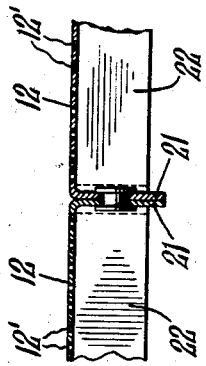
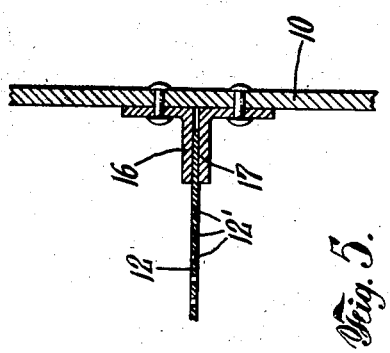
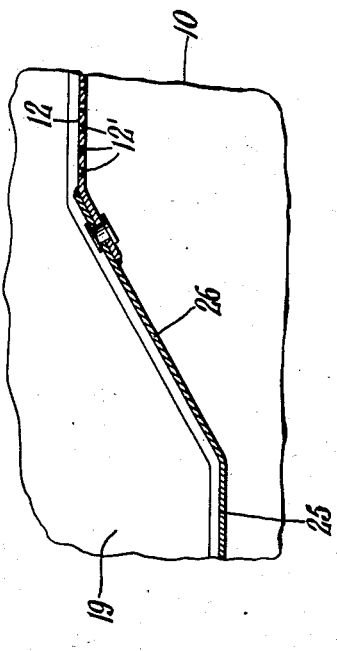
INVENTORS
JOHN G. BENSON
JAMES G. VAN VLEET
GEORGE J. BOSHKOFF
BY Chas. C. Scheffler
ATTORNEY Patented Dec. 29, 1942

2,306,367

UNITED STATES PATENT OFFICE 2,306,367

RECTIFYING APPARATUS

John G. Benson, Cleveland Heights, Ohio, and James G. Van Vleet, Kenmore, and George J. Boshkoff, Snyder, N. Y., assignors to The Linde Air Products Company, a corporation of Ohio Application June 13, 1941, Serial No. 397,870

11 Claims. (Cl. 261—113)

This invention relates to rectifying apparatus and more particularly to improvements in gas and liquid contact devices in rectifying columns especially suitable for the low-temperature separation of gas mixtures.

Rectifying columns, particularly those employed in the low-temperature separation of gas mixtures have been provided with gas and liquid contact devices comprising a series of superimposed circular trays or plates having small perforations. Such trays are arranged so that the liquid phase or reflux liquid is maintained on each tray at a certain depth and is passed downwardly from tray-to-tray through short downtake conduits while the gas phase is passed upwardly through the column and through the perforations in each plate so as to bubble through the liquid thereon in finely divided form. The perforations of the plates or screens are small enough so that the liquid does not pass downwardly through them and the downtakes for the liquid are arranged to prevent the passage of the gas phase therethrough. It has been recognized that in order to obtain an approach to the ideal condition in which the liquid flowing from each plate is in equilibrium with the vapor arising therefrom, it is desirable to attain as closely as possible a completely countercurrent flow of the liquid and gas phase and at the same time have very intimate contact between the liquid and gas phases. The passage of the gas phase in small bubbles through a layer of the liquid phase on a perforated plate or screen provides a very intimate contact between gas and liquid, but the intermixing of the liquid on each plate prevents an adequate approach to the countercurrent flow condition.

To improve the countercurrent flow condition, it has been proposed to make the perforated plates of annular form by closing off a relatively large central area of the plate by a cap and positioning the downtake conduits to cause the liquid to flow in an annular path around each annular plate before it is passed down to the next lower plate. In this manner, the liquid phase becomes progressively enriched in the higher-boiling constituents of the mixture being rectified during the flow around the tray. The length of the annular path of the liquid flowing around the peripheral portions of the plate is substantially greater than the length of the path around the inner portions of the plate adjacent the cap. Therefore, in order that the liquid may be subjected to satisfactory intimate contact with the gas flowing upwardly through the plate, it is necessary to make the central cap on the tray of relatively large diameter. Thus, for a given capacity or rate of flow of gas through the column it is necessary to build the column of larger diameter which increases the cost of the column and increases the surface area exposed to heat leakage from external sources.

At the discharge end of the customary horizontal annular plate, a dam or weir is provided of a height sufficient to maintain the necessary depth of liquid on the portion of the plate adjacent the discharge end. However, in order to cause the liquid to flow around the plate with adequate velocity, the liquid must have, in addition to the depth maintained by the weir, a sufficient head to cause the flow. Therefore, the depth of liquid is substantially greater on the portion of the plate adjacent the receiving end of the plate opposite the discharge end. This causes the upper surface of the liquid to have a hydraulic gradient and the gas phase to pass through a layer of liquid of non-uniform depth. The resistance to gas flow is non-uniform and the tendency is to cause more gas to pass through the plate near its discharge end. The thickness of liquid must be greater than is required for most efficient gas and liquid contact on all parts of the plate than the thickness of liquid on the portion adjacent the discharge end. Therefore, the average resistance to gas flow through each section of the column is greater than it would be if there were no excess liquid thickness on the plate.

The customary downtake conduit arrangement comprises a vertical conduit open at both ends with its upper end secured to the discharge portion of the plate and its open lower end disposed within a receiving cup supported on the next lower tray at its receiving end. The end of the downtake must be spaced a sufficient distance from the bottom of the receiving cup to permit flow of the desired volume of liquid, but the wall of the cup must be high enough to maintain an adequate liquid seal for the downtake in order to prevent passage of any gas phase up through the downtake, thereby insuring that all the gas phase is forced to flow through the perforated portions of the plates. The total height of the downtake must be in excess of the liquid height corresponding to the gas-pressure drop from the space above one plate to the space above the next higher plate. Hence, if the pressure drop is high, the downtake will be high and the separation between plates will be greater than would otherwise be necessary. The necessity for adequate space under the downtake to provide the desired liquid flow rate and the height of the receiving cup wall in order to provide an adequate seal adds to the height of the downtake and thus increases the spacing between plates and the total height of the column.

It is a principal object of the present invention to provide an improved gas and liquid contact device for rectifying columns which shall overcome the disadvantages of prior gas and liquid contact devices. Other more specific objects of the invention are: to provide an improved annular plate for rectifying columns that provides greater efficiency of rectification, increased capacity for a given size of column, or smaller diameter and height of the column for a given throughput of gas; to provide an improved annular plate that insures a uniform depth of liquid thereon and equal gas flow resistance throughout the entire active area of the plate; to provide an improved annular plate that has a relatively small inactive area but yet insures that the time of passage of all the liquid around the plate is substantially equal; to provide an improved annular plate that permits a relatively close spacing between consecutive trays and relatively small total height of the column; and to provide an improved annular plate that is mechanically stable and economical to manufacture.

The manner in which these and still other objects of the invention are attained will be apparent from the following description having reference to the accompanying drawings in which:

Fig. 3 is a view of a section of the tray taken on the line 3—3 of Fig. 1;

Fig. 4 is a fragmentary view of a section taken on the line 4—4 of Fig. 1 showing the receiving cup wall forming the inlet weir;

Fig. 5 is a view of a fragmentary section taken on the line 5—5 of Fig. 1 showing the manner of supporting the plate in the ring; and Fig. 6 is a view of a fragmentary section taken on the line 6—6 of Fig. 1 showing a radial stiffener of the plate.

Figure 1:
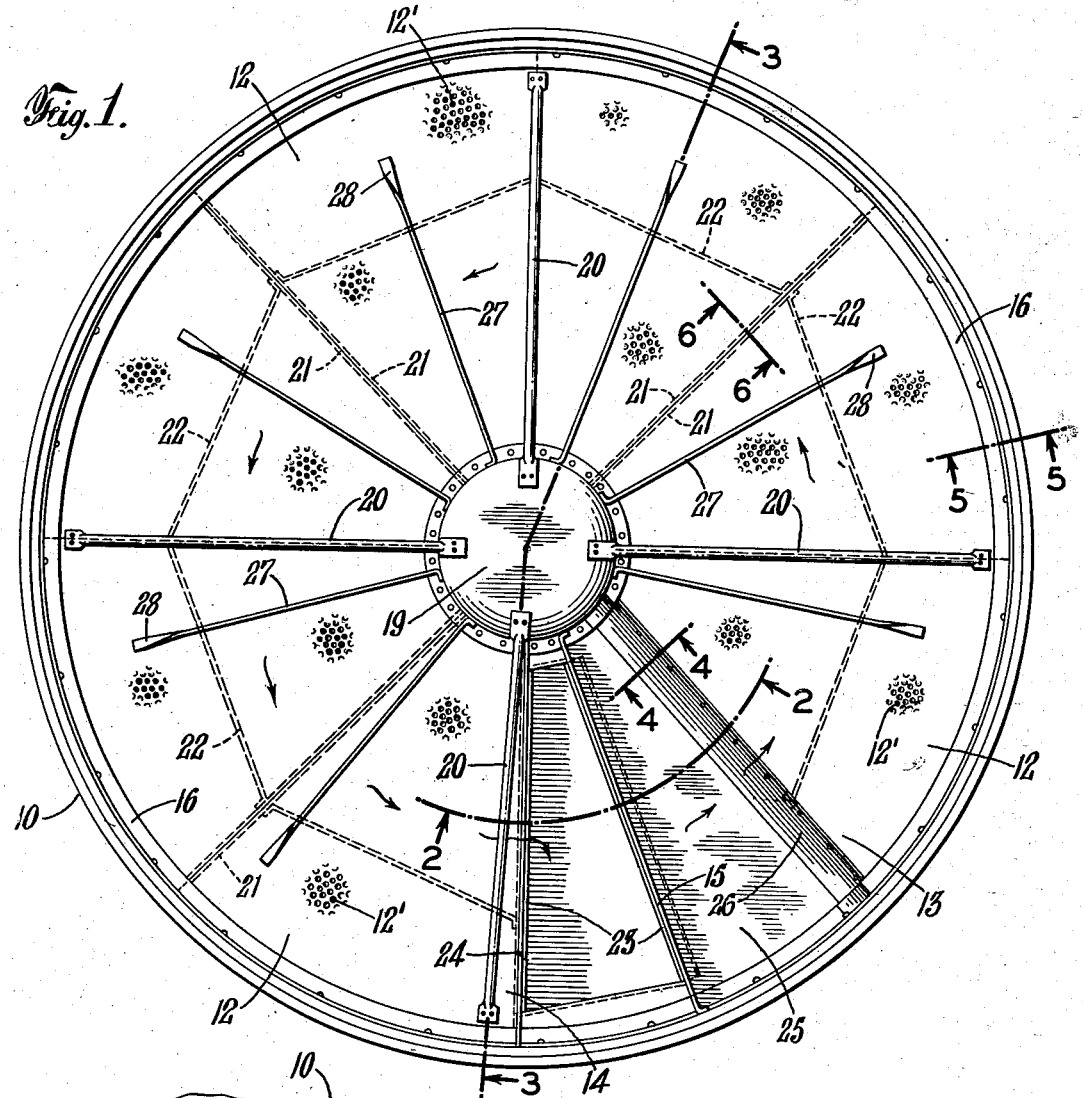
Fig. 1 is a plan view of the improved annular tray or plate section of a rectifying column according to the invention.
Figure 2:
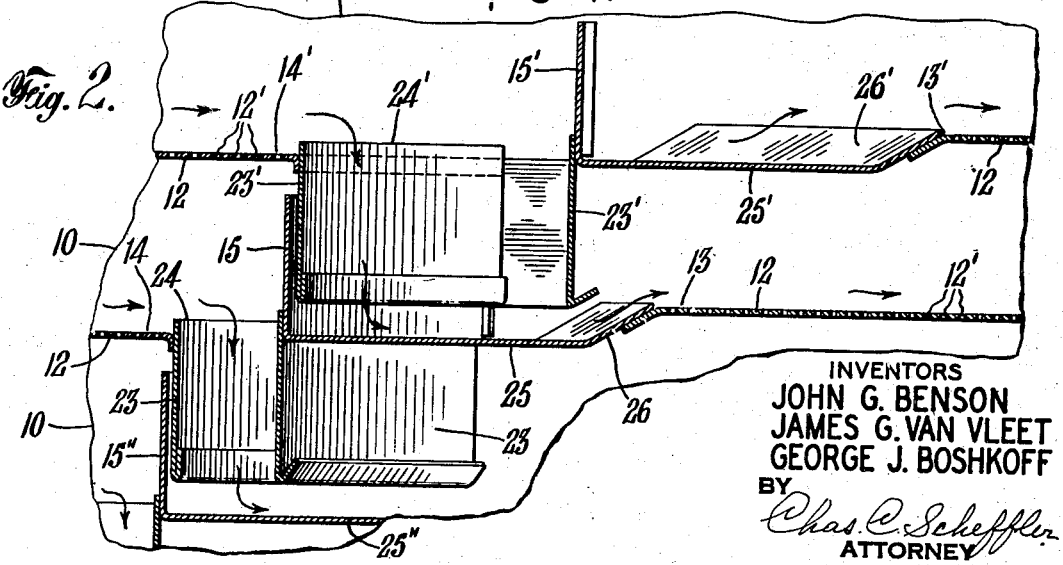
Fig. 2 is a view of a section on an enlarged scale of the tray taken on the line 2—2 of Fig. 1 including portions of adjacent sections above and below the plate.

Referring to the drawings there is illustrated in all the figures except Fig. 2, a single section only of a rectifying column including the improved annular tray or plate according to the invention. In Fig. 2, however, portions of the adjacent upper and lower annular plates are shown to illustrate the path of the liquid from tray-to-tray. The rectifying column is constructed by superposing a plurality of plate sections one on the other. However, since each section is substantially identical with the others in construction, only one section is illustrated in detail.

The column section comprises an annular short cylindrical ring of sheet metal 10. The ring 10 is preferably formed so that it can be conveniently jointed to adjacent similar rings to form a cylindrical column. For example, the ring 10 may be provided with an offset upper rim 11 of slightly larger diameter for overlapping the next higher section. An annular perforated plate 12 is disposed within the ring 10, and is provided with a liquid receiving end portion 13 and a liquid discharge end portion 14 adjacent thereto with a partition 15 therebetween. The active area of the plate 12 is provided with the customary perforations 12' which may be of any customary form, diameter, and spacing suited to the fluids being processed. The annular plate 12 is not horizontal but is gradually pitched downwardly from the receiving end 13 to the discharge end 14. The amount of such downward pitch is preferably made equal to the hydraulic gradient of the liquid flowing on the plate from the receiving portion 13 to the discharge end 14. For example, a suitable pitch for a plate to be employed in an air separating column including the principles of this invention is about 1/60 of the outside diameter of the plate. The actual slope will be greatest along the inner edge and least along the outer edge of the plate. Such radial slope variation is characteristic of the right helicoidal form of the upper surface of the plate 12. The inner and outer margins of a right helicoid are helices having the same pitch but different slopes because their diameters are different. The pitch selected is such as to provide an effective slope which causes the flowing liquid to be of substantially uniform depth and the slope of an intermediate portion of the plate is then substantially equal to the hydraulic gradient of the flowing liquid.

The plate 12 may be supported at its outer peripheral edge in any suitable manner. However, it is preferable to support the plate in such a way that expansion and contraction can take place without distorting the plate. To this end, the plate is secured between a pair of helically formed angles 16 and 17 having inwardly projecting legs adjacent the upper and lower surfaces of the plate. The angles are secured rigidly to the ring 10 but are merely in sliding contact with the plate 12 which has an outer diameter slightly smaller than the inside wall diameter of the ring 10.

A central opening 18 of the plate 12 is sealed by means preventing the passage of liquid or gas such as a suitably formed cap 19 of relatively small diameter the lower rim of which has a helical contour. In order to strengthen the central portion of the plate against vertical displacement by gas pressure, suitable braces may be provided such as four tubular braces 20, the braces 20 being secured or riveted at their inner ends to the top of the cap 19 and at their outer ends to a portion of the plate 12 adjacent the angle 16. If the plate is of relatively large area other means for strengthening it and maintaining it flat may be provided, such as radial ribs 21 extending across the under surface of the plate and formed by downwardly bent edges of adjacent segments of the plate. Additional stiffeners on the underside of the plate may be provided in the form of braces 22 running from each rib 21 to the next rib 21.

The discharge end 14 of the plate 12 is provided with a downtake conduit 23 which may, if desired, be of circular form but is here illustrated as segmental in shape since the segmental form provides an adequate discharge area in a smaller inactive segmental area of the plate. The upper edge of the downtake 23 extends above the plate 12 for a relatively short height to form a discharge dam or weir 24 over which the liquid must flow. Such weir 24 should extend completely across the plate and obviously could be independent of the downtake. Adjacent the downtake 23 and forming one wall of an overflow cup 25" is the radial partition 15" extending upwardly from the next lower section. The downtake 23 extends downward to a level about even with the receiving end of the next lower plate section. The overflow cup 25 is formed to have an inclined discharge wall 26 which passes the liquid smoothly from below the downtake 23' above it and onto the receiving end of the perforated portion of the plate 12 with relatively little turbulence or interference with the direction of movement. The bottom of the cup 25 is preferably positioned below the end of the downtake 23' a sufficient distance to provide adequate area for liquid flow from under the downtake.

In order to insure that the liquid which flows around the portions of the plate adjacent to the cup 19 shall be subject to contact with gas phase for as long a period of time as the liquid which flows around the outer portions of the plate, there are provided, according to the invention, a series of retarding baffles 27 preferably of triangular form and radially positioned at suitable intervals around the cap 19. The baffles 27 are preferably formed so as to offer little resistance at their outer ends and a greater resistance to flow at their inner ends adjacent the cap 19. Seven baffles suitably spaced are shown and preferably comprise triangular sheet-metal strips standing on edge and having end portions twisted to the horizontal and downwardly bent to form feet 28 which are secured to the upper surface of the plate 12 a relatively short distance inward from its outer rim. The inner ends of the baffles are secured to the side wall of the cap 19. The baffles have a lower edge substantially parallel to and spaced very close to but not touching the upper surface of the plate 12 and are preferably perforated with many closely-spaced holes 29. The size, shape, and number of the baffles 27 are arranged so that the liquid flowing in paths near the cup 19 takes just as long to make a circuit of the plate as the time taken by the liquid which flows around the outer portions of the plate. The use of the baffles 27 thus makes it possible to employ a cap 19 of relatively small diameter so that a greater area of the plate 12 is active for gas and liquid contact.

By providing the plate 12 with a slope in the direction of flow, at least equal to the hydraulic gradient, the thickness of the liquid thereon is substantially uniform over the entire active area of the plate and the entire liquid layer is of the desired thickness which provides thorough gas and liquid contact. Since the gas phase bubbles uniformly through the entire active area of the plate, there will be less entrainment of liquid in the gas phase and the space above the plate for the release of such entrainment will be less. The efficiency of each section of the column is thus substantially improved whereby fewer sections are needed to make up the rectifying column. Since there is no excess thickness of liquid for the vapor phase to pass through, the vapor-phase pressure drop upon passage through each plate is smaller so that less power is required to force gas through the rectifying column. The height of each downtake is smaller because the liquid thickness at the receiving end of each plate is smaller. The height of each downtake is also reduced because the pressure drop to be balanced by the liquid column in each downtake is smaller. The height of each downtake is further reduced by the provision of the improved receiving cup arrangement whereby the bottom of the receiving cup is depressed below the receiving end of the plate to at least the level of the discharge end of the plate or to any level providing adequate discharge area at the lower edge of the downtake. Finally, the provision of an upwardly sloping wall for the receiving cup at the receiving end of the plate distributes the liquid evenly across the radial width of the plate.

The rectifying column section, according to this invention, is particularly suited for use in rectifying columns for the separation of gas mixtures such as air. The apparatus of the invention, however, is not limited to such use and the principles of the invention may be employed in apparatus for rectifying liquids and for washing gases with liquids or degasifying liquids. Obviously, certain features of the invention may be used independently of others and changes may be made in various details of the apparatus without departing from the essentials of the invention.

We claim:

1. In a column for the separation of air by rectification at low temperatures, an annular perforated plate, said plate having a liquid receiving end and a liquid discharge end with a partition therebetween, said plate being higher at its receiving end than at its discharge end and having the form of a right helicoid of uniform pitch said pitch being about $1/60$ of the diameter of the outer margin of said plate.

2. In rectifying apparatus, an annular perforated plate, said plate having a liquid receiving end and a liquid discharge end with a partition therebetween, said plate being provided with a cap for sealing a central area thereof, and baffle means extending outwardly from said cap for retarding the rate of flow of liquid around the inner portions of said plate, said plate being higher at its receiving end than at its discharge end, the surface of said plate being a right helicoid of uniform pitch, the slope of the inner portions of said plate being steeper than the slope of the outer portions thereof, the pitch of said plate being such that the slope of an intermediate portion of the plate is substantially equal to the hydraulic gradient of the liquid flowing around the plate from the receiving end to the discharge end whereby a substantially uniform depth of liquid is maintained on the plate.

3. In rectifying apparatus, an annular perforated plate, said plate having a liquid receiving end and a liquid discharge end with a partition therebetween, said plate being provided with a cap for sealing a central area thereof, and baffle means extending outwardly from said cap for retarding the rate of flow of liquid around the inner portions of said plate, said baffle means comprising a plurality of radial baffles of triangular form, said baffles being highest adjacent said cap and sloping downwardly to end at a point inward from the outer margin of said plate.

4. In rectifying apparatus, an annular perforated plate, said plate having a liquid receiving end and a liquid discharge end with a partition therebetween, said plate being provided with a cap for sealing a central area thereof, and baffle means extending outwardly from said cap for retarding the rate of flow of liquid around the inner portions of said plate, said baffle means comprising a plurality of vertical perforated sheet-metal members substantially equally spaced around said cap, said members having a lower edge substantially parallel to and spaced a short distance above the surface of said plate, and an upper edge sloping downwardly from a point adjacent said cap to a point spaced inwardly of the outer margin of said plate.

5. In rectifying apparatus, an annular perforated plate, said plate having a liquid receiving end and a liquid discharge end with a partition therebetween, said plate being higher at its receiving end than at its discharge end and substantially uniformly pitched at an effective slope equal to the hydraulic gradient of the liquid flowing around the plate from the receiving end to the discharge end, a liquid receiving cup adjacent the receiving end of said plate, said cup being disposed between said partition and the receiving end of said plate and having a bottom positioned below the level of said receiving end of said plate.

6. In rectifying apparatus a section adapted to be mounted in superposed relation to other similar sections, said section comprising a cylindrical ring; an annular perforated plate within said ring, said plate having a liquid receiving end and a liquid discharge end adjacent each other and a cap for sealing a central portion of said plate, said plate being downwardly pitched substantially uniformly from its receiving end to its discharge end, said plate also having an external diameter slightly smaller than the internal diameter of said ring; and helically formed members secured to the inner wall of said ring adjacent both upper and lower surfaces of said plate for supporting said plate slideably between them.

7. In rectifying apparatus a section adapted to be mounted in superposed relation to other similar sections, said section comprising a cylindrical ring; an annular perforated plate within said ring, said plate having a liquid receiving end and a liquid discharge end adjacent each other and a cap for sealing a central portion of said plate, said plate being downwardly pitched substantially uniformly from its receiving end to its discharge end; a receiving cup adjacent the receiving end of said plate said cup having a relatively high radially disposed wall forming a partition intermediate between the receiving and discharge ends of the plate, such partition extending from said cap to said ring, said cup having a bottom positioned lower than the receiving end of said plate and a wall opposite said partition joining the bottom of said cup and the receiving end of said plate, said last-mentioned wall being inclined to form an inclined radial weir along the receiving end of said plate.

8. In rectifying apparatus a section adapted to be mounted in superposed relation to other similar sections, said section comprising a cylindrical ring; an annular perforated plate within said ring, said plate having a liquid receiving end and a liquid discharge end adjacent each other and a cap for sealing a central portion of said plate, said plate being downwardly pitched substantially uniformly from its receiving end to its discharge end; a plurality of stiffening ribs on the under surface of said plate; and a plurality of inclined bracing members having their inner ends secured to the top of said cap and their outer ends secured to the upper surface of said plate adjacent the outer margin thereof.

9. In rectifying apparatus a section adapted to be mounted in superposed relation to other similar sections, said section comprising a cylindrical ring; an annular perforated plate within said ring, said plate having a liquid receiving end and a liquid discharge end adjacent each other and a cap for sealing a central portion of said plate, said plate being downwardly pitched substantially uniformly from its receiving end to its discharge end, said plate also having an external diameter slightly smaller than the internal diameter of said ring; helically formed members secured to the inner wall of said ring on both sides of said plate for supporting said plate slideably between them; a receiving cup adjacent the receiving end of said plate, said cup having a relatively high radially-disposed wall forming a partition intermediate between the receiving and discharge ends of the plate, such partition extending from said cap to said ring, said cup having a bottom positioned lower than the receiving end of said plate and a wall opposite said partition joining the bottom of said cup and the receiving end of said plate, said last-mentioned wall being inclined to form an inclined radial weir along the receiving end of said plate; a plurality of stiffening ribs on the under surface of said plate; a plurality of inclined bracing members having their inner ends secured to the top of said cap and their outer ends secured to the upper surface of said plate adjacent the outer margin thereof; and a plurality of radial baffles extending outwardly from said cap for retarding the rate of flow of liquid over the portions of the plate near the cap, said baffles having lower edges substantially parallel to and close to said plate and upper edges sloping downwardly from points adjacent said cap to points a substantial distance inward from the outer margin of said plate.

10. In rectifying apparatus, an annular perforated plate, said plate having a liquid receiving end and a liquid discharge end with a partition therebetween, said plate being provided with a cap for sealing a central area thereof and baffle means extending outwardly from said cap for retarding the rate of flow of liquid around the inner portions of said plate, said plate being higher at its receiving end than at its discharge end and substantially uniformly pitched at an effective slope equal to the hydraulic gradient of the liquid flowing around the plate from the receiving end to the discharge end, a liquid receiving cup adjacent the receiving end of said plate, said cup being disposed between said partition and the receiving end of said plate and having a bottom positioned below the level of said receiving end of said plate.

11. In rectifying apparatus having a cylindrical shell, an annular perforated plate therein disposed transversely of the axis of said shell, said plate having a liquid receiving end and a liquid discharge end with a partition therebetween, means for sealing a central area of said plate, said partition extending from such sealing means to said shell, a liquid receiving cup adjacent the receiving end of said plate, said cup being disposed between said partition and the receiving end of said plate and having a bottom positioned below the level of said receiving end of said plate.

JOHN G. BENSON.
JAMES G. VAN VLEET.
GEORGE J. BOSHKOFF.